(12) United States Patent
Muthuramalingam et al.

(10) Patent No.: US 8,798,928 B2
(45) Date of Patent: Aug. 5, 2014

(54) METHOD AND TOUR PLANNER FOR PLANNING TOUR FOR A GROUP

(75) Inventors: Prathesh Santh Muthuramalingam, Madurai (IN); Sathis Kumar Meganathan, Vellore (IN)

(73) Assignee: Infosys Limited (IN)

( * ) Notice: Subject to any disclaimer, the term of this patent is extended or adjusted under 35 U.S.C. 154(b) by 0 days.

(21) Appl. No.: 13/069,632

(22) Filed: Mar. 23, 2011

(65) Prior Publication Data
US 2012/0016585 A1    Jan. 19, 2012

(30) Foreign Application Priority Data
Jul. 8, 2010  (IN) .......................... 1940/CHE/2010

(51) Int. Cl.
*G01C 21/20* (2006.01)
*G06Q 10/10* (2012.01)

(52) U.S. Cl.
CPC .............. G01C 21/20 (2013.01); G06Q 10/10 (2013.01)
USPC ........... 701/527; 701/533; 701/537; 701/538; 701/540

(58) Field of Classification Search
CPC ........ G01C 21/26; G01C 21/20; G06Q 30/02; G06Q 50/30; G06Q 10/10; G06Q 10/02
USPC ........ 701/202, 210, 527, 533; 705/5, 6, 7, 10, 705/13; 455/414.1, 456.3
See application file for complete search history.

(56) References Cited

U.S. PATENT DOCUMENTS

| | | | |
|---|---|---|---|
| 8,078,485 B1* | 12/2011 | Kraehmueller et al. | 705/7.11 |
| 2001/0047239 A1* | 11/2001 | Kamiya et al. | 701/202 |
| 2002/0016723 A1* | 2/2002 | Matsui et al. | 705/6 |
| 2002/0103693 A1* | 8/2002 | Bayer et al. | 705/10 |
| 2004/0070602 A1* | 4/2004 | Kobuya et al. | 345/738 |
| 2005/0055353 A1* | 3/2005 | Marx et al. | 707/10 |
| 2005/0076159 A1* | 4/2005 | Machida et al. | 710/1 |
| 2005/0234749 A1* | 10/2005 | Attebury et al. | 705/5 |
| 2005/0234750 A1* | 10/2005 | Attebury et al. | 705/5 |
| 2007/0198631 A1* | 8/2007 | Uhlmann | 709/203 |
| 2009/0018902 A1* | 1/2009 | Miller et al. | 705/13 |
| 2009/0119008 A1* | 5/2009 | Kobuya et al. | 701/208 |
| 2009/0234735 A1* | 9/2009 | Maurer | 705/14 |
| 2010/0203868 A1* | 8/2010 | Sagie | 455/414.1 |
| 2011/0035385 A1* | 2/2011 | Teicher | 707/748 |
| 2011/0246610 A1* | 10/2011 | Kobuya et al. | 709/217 |
| 2011/0301835 A1* | 12/2011 | Bongiorno | 701/201 |
| 2011/0313874 A1* | 12/2011 | Hardie et al. | 705/26.1 |
| 2012/0016585 A1* | 1/2012 | Muthuramalingam et al. | 701/527 |

\* cited by examiner

*Primary Examiner* — Tuan C. To
*Assistant Examiner* — Yuri Kan
(74) *Attorney, Agent, or Firm* — Lerner, David, Littenberg, Krumholz & Mentlik, LLP

(57) ABSTRACT

The invention describes a method, a tour planner, and a computer program product for planning a tour for a group including one or more travelers. In various embodiments of the invention, the tour planner enables a traveler to select a travel route and simultaneously share the selected travel route with at least one other traveler. Thereafter, based on the feedback of the other traveler, the selected travel route is either changed or finalized by the group. Further, the method facilitates the group of travelers on the day of the travel by providing each one of them with one or more alerts relating the finalized travel route.

28 Claims, 3 Drawing Sheets

METHOD AND TOUR PLANNER FOR PLANNING TOUR FOR A GROUP

FIELD OF INVENTION

The present invention relates generally to planning a tour for a group. More specifically, it relates to planning a tour for a group using a communication device over a network.

BACKGROUND OF THE INVENTION

Most of the people plan for a vacation/trip ahead of time and discuss the plan among their group/relatives. Today, there are sources that help people in getting important information about the place that they plan like to visit; these sources include travel options, hotels available, places to visit en-route, and places to visit at the destination. However, these sources cater to a single person at a time and not to a group and, thus, planning a tour becomes more challenging for the group. For example, a couple of friends, namely A, B, C, and D, may plan for a trip from Delhi to Jaipur. Most of the times, one of them looks for the information associated with the trip. The information associated with the trip may relate to possible routes, such as R1, R2, R3, and 'sites to visit' options associated with these routes, such as hotels and historical monuments. The traveler may then explore/asses all the advantages and disadvantages associated with the possible routes, such as route R1 may contain more visiting options than route R2 and route R3; however, route R2 may be the shortest route and, similarly, route R3 may be the busiest route. Depending on these characteristics, the route for a journey may be finalized by the group's consensus. However, obtaining this information associated with the routes within a stipulated period of time can be a tedious and time-consuming process as the travelers depend on known public information or that sought from other people. Optionally, they may choose to browse through various online sources and try to obtain the information.

There are various online solutions available for planning the tour. These solutions help the travelers extract the desired tour information. However, the information is available in the form of a text, a map, and so forth. The travelers may have to find all such information on their own and may be required to print a copy of various maps that can be utilized on the day of the travel to help them navigate. Thus, it makes the available online solutions tedious and cumbersome for people who are not proficient with searching over the Internet. Therefore, the people fall short of the required knowledge and information for planning the trip.

Another important aspect in addition to planning the tour is that the travelers must be aware of the sites to visit and important places such as parks, hotels, Automated Teller Machines (ATMs), service centers, gas stations, police stations, and hospitals. Currently, there are few independent solutions that use location-based services and facilitate identifying such options. In addition to the above, the travelers would most of the times like to be aware of the traffic and weather conditions on the route that they are travelling. Similar to the location-based services, there are independent solutions that aid the travelers in getting such updates on a typical Global Positioning System (GPS) navigation device.

Since most of these solutions and methodologies are independent in nature, it becomes difficult for a traveler to plan and execute a trip in the most time efficient and effective manner. Thus, there is a need of a method and an integrated system that enable the traveler to plan a trip effectively and also simultaneously enable the traveler to receive various information associated with the tour during the course of travel.

SUMMARY OF THE INVENTION

The invention provides a method, tour planner, and computer program product for planning a tour for a group of travelers. Further, the planning is performed using a communication device. The method enables a traveler to select a travel route from one or more travel routes based on a departure point and a destination point. Thereafter, the method enables the traveler to share the travel route with at least one other traveler using the communication device. The method then facilitates receiving the feedback on the shared travel route from the other traveler. Based on the received feedback, the traveler may then finalize the travel route. On the day of the travel, the method aids the travelers to receive various alerts on their respective communication devices. These alerts are associated with the visiting options and important places associated with the finalized travel route.

The tour planner includes a selecting module, a sharing module, a feedback receiving module, a finalizing module, an alert receiving module, an information module, a digitized map module, a memory module, a contact module, and a rating module. In various embodiments of the invention, the tour planner enables the traveler to plan a tour for a group. The selection module helps the traveler to select a travel route from multiple available travel routes between a departure point and a destination point. Various travel routes are displayed to the traveler by the digitized map module. Thereafter, the traveler shares the travel route with the other travelers in the group with the help of a sharing module for their feedback. The feedback receiving module receives the feedback on the travel route from the other travelers and enables the traveler to view the feedback. Subsequently, the finalizing module facilitates the traveler to finalize the travel route. The alert receiving module, on the day of travel, enables the traveler and the other travelers in the group to receive one or more alerts on their communication devices. The alerts may be related to traffic conditions, weather conditions, important places en-route, and the like. Further, the information module provides the traveler with information data points associated with the other travelers, important places, and the like. Furthermore, the contact module facilitates the traveler to contact the other travelers, important places, and the like based on the associated information data points. In addition to the mentioned modules, the rating module facilitates the traveler to provide a rating to the important place that he may have visited during the tour.

The method, the tour planner, and the computer program product described above have a number of advantages. The tour planner facilitates the traveler to plan and execute the trip in the most hassle-free manner. The traveler is provided with a software application that interacts with various servers and provides an end-to-end travel solution. The traveler is facilitated to plan, share, and collaborate the tour plan with other travelers associated with the group in an efficient manner by means of the communication device. Further, since the tour planner can be integrated with any communication device, such as a mobile phone, a desktop, a laptop, and the like, it becomes easy for the group to utilize the functionalities of the tour planner. Further, the tour planner provides a wide range of alerts to the traveler on the day of travel, thereby helping the group with the necessary and timely information.

BRIEF DESCRIPTION OF THE DRAWINGS

The various embodiments of the invention will hereinafter be described in conjunction with the appended drawings provided to illustrate, and not to limit, the invention, wherein like designations denote like elements, and in which.

DETAILED DESCRIPTION

The invention describes a method, a tour planner, and a computer program product for planning a tour for a group including one or more travelers. In various embodiments of the invention, the tour planner enables a traveler to select a travel route and simultaneously share the selected travel route with at least one other traveler. Thereafter, based on the feedback of the other traveler, the selected travel route is either changed or finalized by the group. Further, the method facilitates the group of travelers on the day of the travel by providing each one of them with one or more alerts relating to the finalized travel route.

Figure 1:
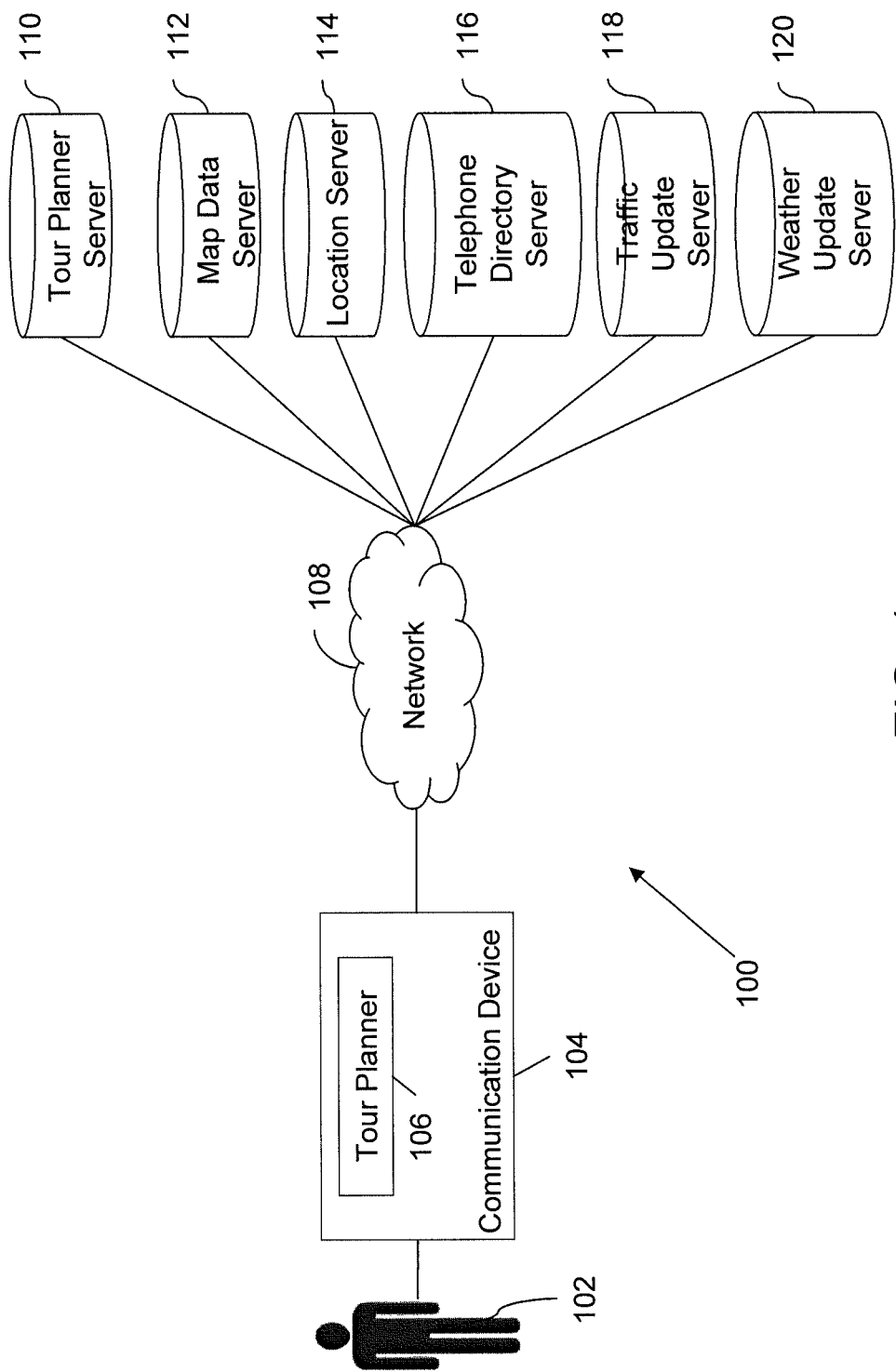
FIG. 1 is an environment in which various embodiments of the invention may be practiced.

FIG. 1 is an environment 100 in which various embodiments of the invention may be practiced. Environment 100 includes a user 102, and a communication device 104 including a tour planner 106. Tour planner 106 interacts over a network 108 with a tour planner server 110, a map data server 112, a location server 114, a telephone directory server 116, a traffic update server 118, and a weather update server 120.

User 102 accesses tour planner 106 using his/her communication device 104. Further, tour planner 106 enables user 102 to plan a tour for a group. In various embodiments of the invention, the tour is planned among a group of users. Further, all the users, such as user 102, associated with the group interact with each other using their corresponding communication devices, such as communication device 104, for planning the tour. In an exemplary embodiment of the invention, environment 100 is depicted for user 102 of the group. Similarly, such an environment will be available for each user of the group to help him/her interact with the other. Further, the planning of the tour among the group is explained in detail in conjunction with FIG. 2 and FIG. 3.

Tour planner 106 interacts with various servers to enable multiple functionalities for user 102 and the other users associated with group. Examples of various servers include, but are not limited, to map data server 112, location server 114, telephone directory server 116, traffic update server 118 and weather update server 120. Various functionalities, such as weather update service, traffic update service, and location-based service, enabled by these servers are explained in detail in conjunction with FIG. 2 and FIG. 3.

In various embodiments of the invention, tour planner 106 may be a software application that may be installed on communication device 104. In an embodiment of the invention, tour planner 106 may be stored at a remote server, such as tour planner server 110, and it can be downloaded by each of the users, such as user 102. In another embodiment of the invention, tour planner 106 may be preinstalled on the communication devices, such as communication device 104, of the users. Various examples of communication device 104 include, but are not limited to, a mobile phone, a Personal Digital Assistant (PDA), a laptop, a desktop, and the like. Further, network 108 may be any wired network, wireless network, or a combination thereof.

Figure 2:
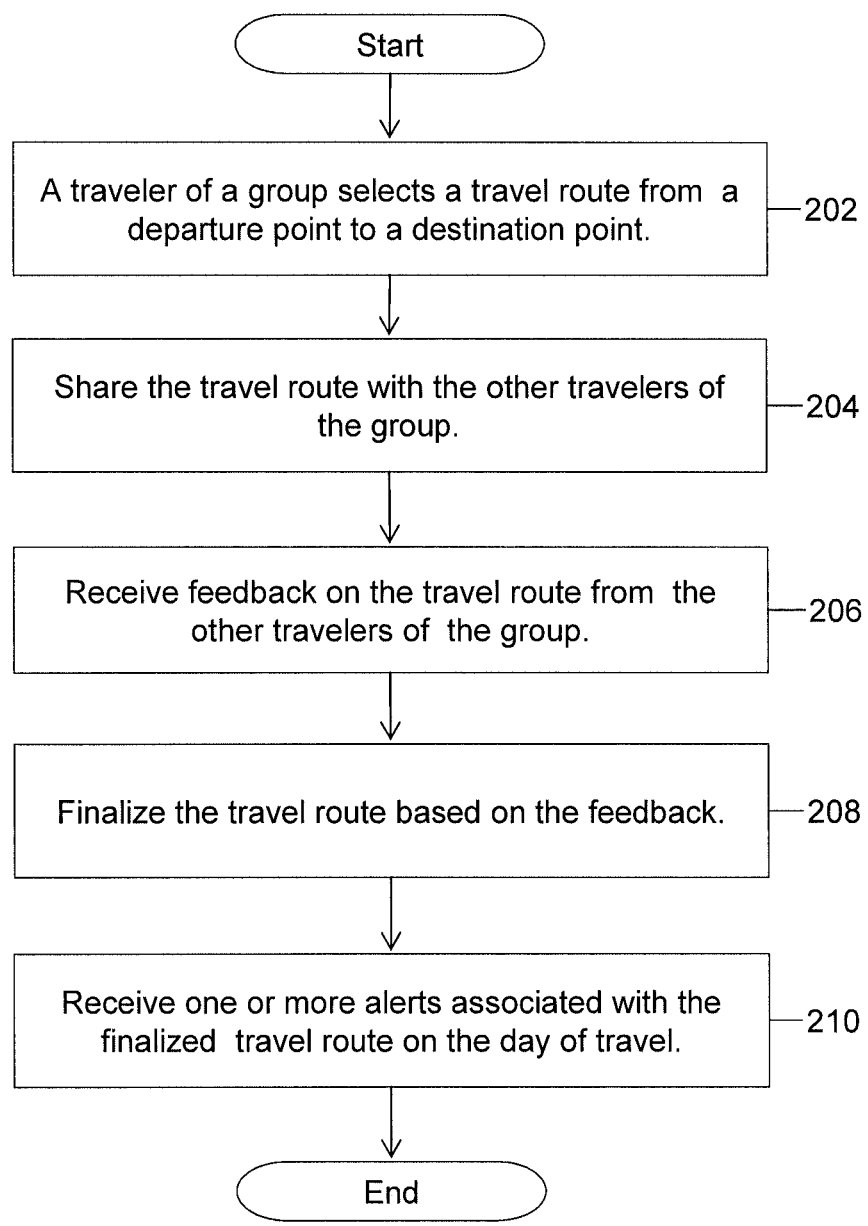
FIG. 2 is flowchart of a method for planning a tour for a group, in accordance with an embodiment of the invention.

FIG. 2 is a flowchart of a method for planning a tour for a group, in accordance with an embodiment of the invention. As explained above, the group includes one or more users, such as user 102. For the sake of clarity, herein onwards, user 102 may be referred to as a traveler.

In various embodiments of the invention, the traveler may wish to travel to a place on a particular date. Thus, at 202, he may begin the process of planning the tour by selecting a travel route from a departure point to a destination point. It may be evident to any person skilled in the art that there may be various travel routes available between the departure point and the destination point. The traveler may select the travel route that best suits him/her as per his/her desire and requirements. Further, the travel route is selected by the traveler with the help of his/her communication device, such as communication device 104. It may be apparent to any person skilled in the art that the communication device may interact with a remote server providing map-based services, such as map data server 112, pre-stored with multiple maps to display various available travel routes between the departure point and the destination point.

In an embodiment of the invention, the traveler is provided with various route details that help select the travel route. The route details may include, but are not limited to, road information, such as national highway, state highway, toll information, predefined user rating based on experience, important places on the travel route, and approximate distance. These route details may be stored at a central server, such as tour planner server 110, which interacts with the communication device and map data server 112 simultaneously for providing the associated route details, along with the displayed travel routes to the traveler.

The traveler then, at 204, shares the selected travel route with other travelers of the group over a network, such as network 108, using the communication device. In addition to sharing the selected travel route, details associated with the travel route are also shared with other travelers. Various examples of the details may include, but are not limited to, a date of travel, approximate travel distance, important places on the selected travel route, and the like. In an embodiment of the invention, the traveler may share the selected travel route by a Short Message Service (SMS), a voice SMS, a Multimedia Messaging Service (MMS), an electronic mail (Email), and the like.

Thereafter, at 206, the traveler (user 102) may receive feedback on the travel route from the other travelers over the network. In various embodiments of the invention, at least one other traveler may review the shared travel route on his/her communication device and provide feedback. For example, the other traveler may already be aware that the shared travel route has certain drawbacks, such as bad roads, heavy traffic through out the year, and the like. In another embodiment of the invention, the feedback may indicate an acceptance of the shared travel route. In yet another embodiment of the invention, the other traveler may alter the travel route and select a new travel route at his/her end in a similar fashion as described in 202 and then share it with the traveler (user 102). In various embodiments of the invention, the feedback is shared among all the travelers associated with the group. It may be apparent to any person skilled in the art that the feedback is shared through the communication devices. In various embodiments of the invention, the feedback may be received in the form of a Short Message Service (SMS), a Multimedia Messaging Service (MMS), a voice SMS, an electronic mail (Email), a voice call, a conference call, and the like.

Subsequently, at 208, based on the feedback received from other travelers, the traveler (user 102) may then finalize the travel route. It may be apparent to any person skilled in the art that the feedback may be received from one or more other travelers and, based on the common consensus among the group, the traveler (user 102) finalizes the travel route for the group. In an embodiment of the invention, on the day of travel, each traveler of the group may start from the same location for the destination. In another embodiment of the invention, each/few travelers may start from different locations and head for the same destination.

In an embodiment of the invention, the finalized travel route, along with the associated details, is stored at the central server. It may be evident to any person skilled in the art that travelers associated with the group may access the finalized travel route at any point in time from the central server. Further, the finalized travel route may be stored using a unique identifier such as a user group identifier, and it can be accessed by the any member of the group by providing the requisite identifier. Similar means may be employed to enable adding security measures, such as passwords, to enable the travelers to access the finalized itinerary.

On the day of travel, the traveler receives one or more alerts associated with the finalized travel route on the communication device at 210. Various examples of the alerts may include, but are not limited to, at least one traffic condition, a weather condition, and at least one important place, such as hotels, Automated Teller Machines (ATMs), police stations and gas stations. Similarly, various other travelers associated with the group may also receive similar alerts on their communication devices. Further, various kinds of alerts have been explained in detail in conjunction with FIG. 3.

It may be apparent to any person skilled in the art that the traffic condition of the travel route may be provided by a server, such as traffic update server 118. Similarly, the weather condition may be provided by a server, such as weather update server 120. Further, the alerts associated with the important places may be provided by a server, such as location server 114. Furthermore, there are various other functionalities, such as receiving the location information about the travelers, receiving the contact numbers of the important places on the travel route, and the like, which are explained in detail in conjunction with FIG. 3.

Figure 3:
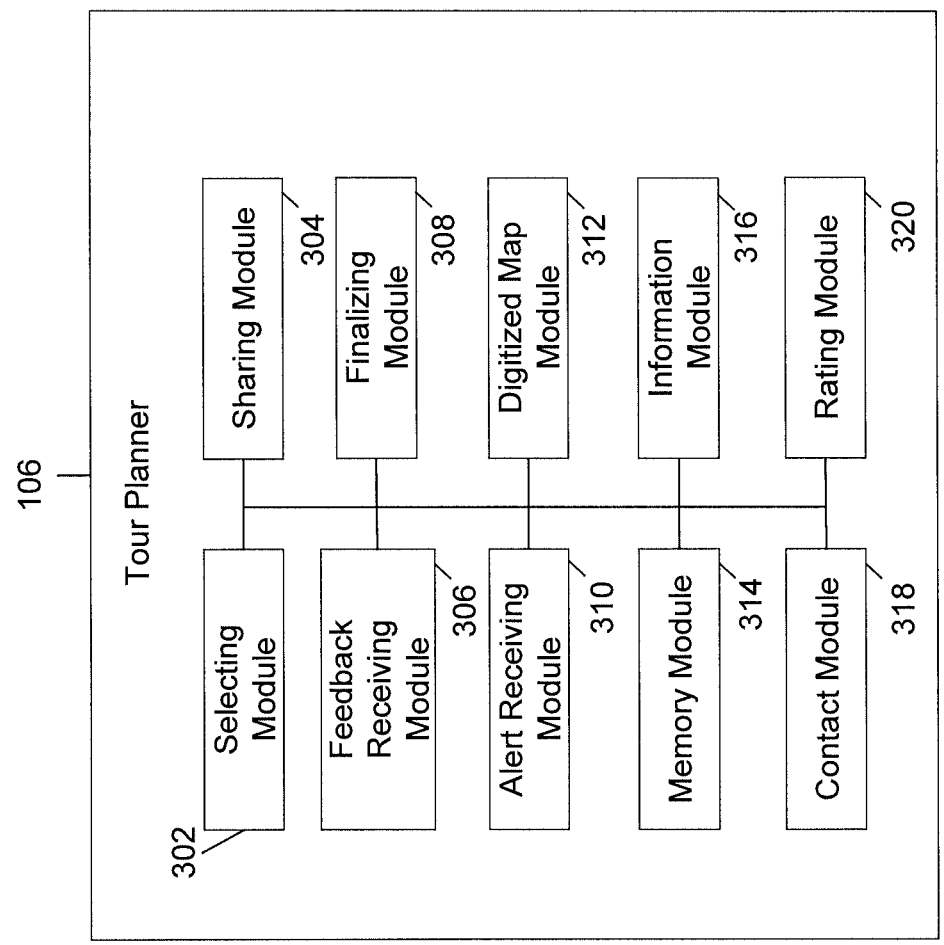
FIG. 3 is a block diagram of a tour planner for planning a tour for a group, in accordance with an embodiment of the invention.

FIG. 3 is a block diagram of tour planner 106 for planning a tour for a group, in accordance with an embodiment of the invention. Tour planner 106 includes a selecting module 302, a sharing module 304, a feedback receiving module 306, a finalizing module 308, an alert receiving module 310, a digitized map module 312, a memory module 314, an information module 316, a contact module 318, and a rating module 320.

In various embodiments of the invention tour planner 106 may be a software application installed on communication device 104. Further, as discussed above, tour planner 106 facilitates user 102 to plan a tour for a group. Furthermore, tour planner 106 also provides various functionalities to user 102, hereinafter referred to as a traveler, in addition to helping in planning the tour. The planning of the tour and various functionalities are explained in detail below.

The traveler may access tour planner 106 using communication device 104. In an embodiment of the invention, the traveler may create a group by providing one or more details of the travelers, such as name, phone number and Email address. Thereafter, the traveler may save the created group at tour planner server 110. It may be evident to a person skilled in the art that since the details of the travelers associated with the group are stored at tour planner server 110, it may be used by any member of the group at any instance of time.

Thereafter, selecting module 302 facilitates the traveler to select a travel route between a departure and a destination point. In an embodiment of the invention, selecting module 302, while interacting with map data server 112, identifies various travel routes based on the departure point and the destination point. Subsequently, digitized map module 312 displays various identified travel routes (in the form of digitized maps) to the traveler on communication device 104. Further, various other route details are also displayed to the traveler, along with the associated travel routes. Various examples of the route details have been explained in detail in conjunction with FIG. 2. The traveler then selects one travel route from the various identified travel routes based on his/her desire and requirements.

Post the selection, sharing module 304 facilitates the traveler to share the selected travel route, along with the associated route details with other travelers in the group. The traveler may share the selected travel route over network 108 in the form of a Short Message Service (SMS), a voice SMS, a Multimedia Messaging Service (MMS), an electronic mail (Email), and the like. Subsequently, feedback receiving module 306 receives feedback from at least one other traveler on the shared travel route. The feedback may include altering the travel route, accepting the travel route, one or more suggestions on the travel route, and the like. In an embodiment of the invention, the feedback may be shared over network 108 in the form of a Short Message Service (SMS), a voice SMS, a Multimedia Messaging Service (MMS), an electronic mail (Email), a regular voice call to discuss the travel route, and the like.

Finalizing module 308 then helps the traveler finalize the travel route for the group. In an embodiment of the invention, finalizing module 308 may display options such as 'Accept', 'Change', and 'Reject'. Thereafter, the finalized travel route is stored at tour planner server 110 for any future use. In an embodiment of the invention, memory module 314 facilitates the traveler to save the finalized travel route on tour planner server 110.

Alert receiving module 310, on the day of travel, facilitates the traveler to receive various alerts associated with the finalized travel route. In an embodiment of the invention, the alerts may be related to weather condition, traffic condition, the important places, and the like. For example, alert receiving module 310 may interact with traffic update server 118 and weather update server 120 to provide the alerts of the weather condition and the traffic condition respectively. Further, based on the traffic/weather conditions, at least one alternative travel route may be suggested to the traveler. Furthermore, an alert for important places, such as "a gas station ahead in next 2 Kms" may be provided to the traveler. Similarly, an update on a hotel or a departmental store may be provided to the traveler. In an exemplary embodiment of the invention, the alerts associated with the important places, such as hotels, may be provided based on the time displayed on communication device 104. In another embodiment of the invention, alert receiving module 310 also alerts the traveler about the distance traversed/left from the departure/destination respectively of the other travelers. For example, the alert may be 'A' (other traveler) is 15 KMs from the destination or 'A' has travelled 65 KMs from the departure. In yet another embodiment of the invention, alert receiving module 310 alerts the traveler about his/other travelers' average expected time of arrival to the destination based on the distance left/ traffic intensity/other parameters among the group. For example, if 'A' has travelled 60 KMs in 2 hours from the departure starting at 7.00 AM, the alert may be "'A' (other traveler) is 15 KMs from the destination and is expected to reach the destination in another 30 minutes (i.e. by 9.30 AM)". The alerts as described above may be provided in form of an SMS, an MMS, an Email, voice playback, text to speech format, and the like.

It may be apparent to any person skilled in the art that the traveler on the travel route receives various such alerts based on his/her corresponding location and the location of the other travelers of the group. In various embodiments of the invention, the location of the traveler/other travelers is constantly tracked by location server 114. A typical location server, such as location server 114, may use a Global Positioning System (GPS), a Cellular Identification (Cellular ID)-database or a Wireless Fidelity (WIFI) access point-based database, or a combination of these methodologies, to determine the location of the traveler/other travelers.

In another embodiment of the invention, alert receiving module 310 may be pre-programmed for the alerts by the traveler. In other words, the traveler may decide the alerts that he/she may want to receive during the course of the travel. For example, the traveler may be interested only to receive traffic and weather related updates and is not interested to know about the important places. In such as scenario, the traveler may pre-program alert receiving module 310 to receive the alerts only from traffic update server 118 and weather update server 120.

Information module 316 provides at least one information data point associated with the other travelers and the important places associated with the travel route to the traveler. Various examples of the information data points may be phone numbers, Email addresses, addresses associated with the important places, and the like. In an embodiment of the invention, the location of the traveler and the other travelers associated with the group is constantly displayed on communication device 104 by digitized map module 312. Thus, information module 316 helps the traveler obtain the information data point associated with the other traveler displayed on the digitized map. For example, the traveler may click on the other traveler's location that is displayed on the digitized map to get the associated information data point. Information module 316 also facilitates the traveler to get information data point associated with the important places, such as hotels, hospitals, and banks, on the travel route. In an embodiment of the invention, information module 316 interacts with telephone directory server 116 to provide information data point to the traveler. In another embodiment of the invention, information module 316 may provide the information data-point to the traveler from a database, such as a phone book, pre-stored in communication device 104.

Contact module 318 facilitates the traveler to contact other travelers and important places based on the associated information data-points. For example, the traveler may call, send an SMS, email, etc to the other travelers. In an embodiment of the invention, contact module 318 may display various options, such as 'Call', 'Email', and 'SMS', to the traveler, thereby facilitating the traveler to contact other travelers.

Rating module 320 facilitates the traveler to provide ratings to an important place visited during the tour. For example, the traveler may like a particular restaurant and provide a rating corresponding to his/her experience. The rating may then be stored at tour planner server 110, and it may then later be used by other travelers as a detail associated with the corresponding important place. In an embodiment of the invention, the ratings may be also provided to the traveler in the form of alerts.

In another embodiment of the invention, tour planner 106 may be also enabled with the functionalities that the traveler may choose to find the important places around at any instance of time. Similarly, the traveler may choose to locate his/her friends/other travelers in close range. Further, tour planner 106 may be similarly used to track people among different groups, thereby facilitating coordination not only between the travelers associated with the group but also across groups. In yet another embodiment of the invention, tour planner 106 may be equipped with more user-friendly functionalities that may enable the travelers to plan and execute the tour.

In various embodiments of the invention, selecting module 302, sharing module 304, feedback receiving module 306, finalizing module 308, alert receiving module 310, digitized map module 312, memory module 314, information module 316, contact module 318, and rating module 320 can be implemented in the form of hardware, software, firmware, and/or combinations thereof.

In various embodiments of the invention, tour planner 106 (not shown in the figure) utilizes the computational capabilities of a microprocessor of communication device 104.

The method, the tour planner, and the computer program product described above have a number of advantages. The tour planner facilitates the traveler to plan and execute a trip in the most hassle-free manner. The traveler is provided with a software application that interacts with various servers and provides an end-to-end travel solution. The traveler is facilitated to plan, share, and collaborate the tour with other travelers associated with the group in an efficient manner by means of the communication device. Further, since the tour planner can be integrated with any communication device, such as, a mobile phone, a desktop, or a laptop, it becomes easy for the group to use the functionalities of the tour planner. Further, the tour planner provides a wide range of alerts to the traveler on the day of travel, thereby helping the group with the necessary and timely information.

The tour planner for planning a tour for a group, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM), and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for planning a tour for a group. The computer program product includes a computer usable medium having a set program instructions comprising a program code for planning a tour for a group. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The invention claimed is:

1. A computer-implemented method for planning a tour for a group on a travel day, the group comprising one or more travelers, each traveler of the group having a communication device, the method comprising:
   a. selecting a travel route by a traveler of the group, via program instructions executed by a microprocessor, from a departure point to a destination point, the travel route being selected from one or more travel routes available between the departure point and the destination point;
   b. transmitting the selected travel route by the traveler of the group simultaneously to at least one other traveler's communication device of the group along with one or more details associated with the travel route over a network, via program instructions executed by the microprocessor, during the course of travel on the travel day, the travelers of the group interactively communicating with each other using their corresponding communication devices on the travel day;
   c. receiving feedback on the transmitted travel route in real-time, via program instructions executed by the microprocessor, from the at least one other traveler's communication device during the course of travel on the travel day;
   d. finalizing the travel route for the group, via program instructions executed by the microprocessor, wherein the travel route is finalized after implementing changes to the travel route in real-time based on the received feedback during the course of travel on the travel day;
   e. transmitting, via program instructions executed by the microprocessor, the finalized travel route to other travelers of the group during the course of travel on the day of travel; and
   f. receiving, via program instructions executed by the microprocessor, one or more alerts associated with the finalized travel route during the course of travel on the day of travel.

2. The computer-implemented method according to claim 1 further comprising storing the finalized travel route on a central server.

3. The computer-implemented method according to claim 1, wherein the travel route is shared over a network using the communication device by at least one of a Short Message Service (SMS), a Multimedia Messaging Service (MMS), a voice SMS, and an Electronic mail (Email).

4. The computer-implemented method according to claim 1 further comprising displaying at least one of the one or more travel routes, via program instructions executed by the microprocessor, the selected travel route, and the finalized travel route on a digitized map.

5. The computer-implemented method according to claim 4 further comprising displaying at least one information data point, via program instructions executed by the microprocessor, associated with the one or more travelers of the group on the digitized map on the day of travel.

6. The computer-implemented method according to claim 5 further comprising facilitating the traveler, via program instructions executed by the microprocessor, to contact the at least one other traveler based on the corresponding at least one information data point displayed on the digitized map.

7. The computer-implemented method according to claim 1, wherein the one or more alerts comprise information associated with at least one of a traffic condition, a weather condition, and at least one important place.

8. The computer-implemented method according to claim 7 further comprising facilitating the traveler, via program instructions executed by the microprocessor, to contact the at least one important place.

9. The computer-implemented method according to claim 1, wherein at least one alternative travel route is communicated to at least one traveler of the group based on the one or more alerts.

10. The computer-implemented method according to claim 9, wherein the at least one alternative travel route is communicated through at least one of a Short Message Service (SMS), a Multimedia Messaging Service (MMS), a voice call, an Electronic mail (Email) and a conference call.

11. The computer-implemented method according to claim 1, wherein at least one of the traveler and the at least one other traveler is facilitated to provide a rating, via program instructions executed by the microprocessor, corresponding to at least one important place associated with the finalized travel route.

12. The computer-implemented method according to claim 1, wherein the one or more alerts are associated with a location of the traveler of the group, wherein the location of the traveler is identified by at least one of a Global Positioning System (GPS), a Cellular Identification (Cellular ID) based database and a Wireless Fidelity (WIFI) access point based database.

13. A tour planner for planning a tour for a group, the group comprising one or more travelers, each traveler of the group having a communication device, the tour planner being integrated in the communication device, the tour planner comprising:
   a. a selecting module in communication with a microprocessor and operative to facilitate a traveler of the group to select a travel route from a departure point to a destination point, the travel route being selected from one or more travel routes available between the departure point and the destination point;
   b. a sharing module in communication with the microprocessor and operative to facilitate the traveler of the group to transmit the selected travel route simultaneously to at least one other traveler's communication device of the group along with one or more details associated with the travel route, via program instructions executed by the microprocessor, during the course of travel on the travel day, the travelers of the group interactively communicating with each other using their corresponding communication devices on the travel day;

c. a feedback receiving module in communication with the microprocessor and operative to receive feedback on the transmitted travel route in real-time, via program instructions executed by the microprocessor, from the at least one other traveler's communication device of the group during the course of travel on the travel day, the feedback being received over a network;

d. a finalizing module in communication with the microprocessor and operative to finalize the transmitted travel route, the travel route being finalized by the group after implementing changes to the travel route in real-time based on the received feedback during the course of travel on the travel day, wherein the finalized travel route being shared with other travelers of the group; and e. an alert receiving module in communication with the microprocessor and operative to receive one or more alerts associated with the finalized travel route during the course of travel on the day of travel.

14. The tour planner according to claim 13 further comprising a memory module in communication with the microprocessor and operative to store the finalized travel route on a central server.

15. The tour planner according to claim 13, wherein the sharing module shares the travel route by at least one of a Short Message Service (SMS), a Multimedia Messaging Service (MMS), a voice SMS, and an Electronic mail (Email).

16. The tour planner according to claim 13 further comprising a digitized map module in communication with the microprocessor and operative to display at least one of the one or more travel routes, the selected travel route, and the finalized travel route on a digitized map.

17. The tour planner according to claim 16 further comprising an information module in communication with the microprocessor and operative to provide at least one information data point associated with the one or more travelers of the group on the digitized map on the day of travel.

18. The tour planner according to claim 17 further comprising a contact module in communication with the microprocessor and operative to contact the at least one other traveler based on the corresponding at least one information data point displayed on the digitized map.

19. The tour planner according to claim 18, wherein the contact module in communication with the microprocessor and is further operative to facilitate the traveler to contact at least one important place associated with the finalized travel route.

20. The tour planner according to claim 13 further comprising a rating module in communication with the microprocessor and operative to facilitate the traveler to provide the rating corresponding to at least one important place associated with the finalized travel route.

21. A computer program product for planning a tour for a group on a travel day, the group comprising one or more travelers, each traveler of the group having a communication device, the computer program product comprising: computer-usable medium having program code stored thereon, the program code comprising instructions that, when executed by a microprocessor, cause the microprocessor to:

a. select a travel route from a departure point to a destination point, the travel route being selected from one or more travel routes available between the departure point and the destination point, the travel route being selected by a traveler of the group;

b. transmit the selected travel route by the traveler of the group simultaneously to at least one other traveler's communication device of the group along with one or more details associated with the travel route, the travel route being shared over a network during the course of travel on the travel day, the travelers of the group interactively communicating with each other using their corresponding communication devices on the travel day;

c. receive feedback on the transmitted travel route in real-time from the at least one other traveler's communication device of the group during the course of travel on the travel day, the feedback being received over the network;

d. finalize the transmitted travel route based on the feedback, the travel route being finalized by the group after implementing changes to the travel route in real-time based on the received feedback during the course of travel on the travel day;

e. transmitting the finalized travel route to other travelers of the group during the course of travel on the day of travel; and f. receive one or more alerts associated with the finalized travel route during the course of travel on the day of travel.

22. The computer program product according to claim 21 wherein the program code further comprises instructions that, when executed by the microprocessor, cause the microprocessor to store the finalized travel route on a central server.

23. The computer program product according to claim 21 wherein the program code further comprises instructions that, when executed by the microprocessor, cause the microprocessor to display at least one of the one or more travel routes, the selected travel route, and the finalized travel route on a digitized map.

24. The computer program product according to claim 23 wherein the program code further comprises instructions that, when executed by the microprocessor, cause the microprocessor to display at least one information data point associated with the one or more travelers of the group on the digitized map on the day of travel.

25. The computer program product according to claim 24 wherein the program code further comprises instructions that, when executed by the microprocessor, cause the microprocessor to facilitate the traveler to contact the at least one other traveler based on the corresponding at least one information data point displayed on the digitized map.

26. The computer program product according to claim 21, wherein the one or more alerts comprise information associated with at least one of a traffic condition, a weather condition, and at least one important place.

27. The computer program product according to claim 26 wherein the program code further comprises instructions that, when executed by the microprocessor, cause the microprocessor to facilitate the traveler to contact the at least one important place.

28. The computer program product according to claim 21 wherein the program code further comprises instructions that, when executed by the microprocessor, cause the microprocessor to facilitate at least one of the traveler and the at least one other traveler to provide a rating corresponding to at least one important place associated with the finalized travel route.

* * * * *